(12) United States Patent
Hurlbutt (10) Patent No.: US 7,886,880 B1
(45) Date of Patent: Feb. 15, 2011

(54) BLIND CONNECTION BRAKE LEVER FOR A DRUM BRAKING SYSTEM

(75) Inventor: Ryan M. Hurlbutt, Niles, MI (US)

(73) Assignee: Robert Bosch GmbH, Stuttgart, DE (US)

(*) Notice: Subject to any disclaimer, the term of this patent is extended or adjusted under 35 U.S.C. 154(b) by 0 days.

(21) Appl. No.: 12/603,887

(22) Filed: Oct. 22, 2009

(51) Int. Cl.
*B60T 1/00* (2006.01)

(52) U.S. Cl. .................... 188/2 D; 188/325
(58) Field of Classification Search ............ 188/2 D, 188/106 A, 106 F, 331, 325; 74/502.6
See application file for complete search history.

(56) References Cited

U.S. PATENT DOCUMENTS

| | | | |
|---|---|---|---|
| 4,753,325 A | 6/1988 | Jaksic | |
| 5,137,120 A | 8/1992 | Barbosa | |
| 5,142,935 A * | 9/1992 | Carr | 74/502.6 |
| 5,706,914 A | 1/1998 | Goldstein | |
| 6,612,407 B2 * | 9/2003 | Jones | 188/74 |
| 6,651,782 B2 * | 11/2003 | Asai et al. | 188/2 D |

* cited by examiner

*Primary Examiner*—Christopher P Schwartz
(74) *Attorney, Agent, or Firm*—Maginot, Moore & Beck (57) ABSTRACT

A drum braking system includes, a brake lever assembly having a brake lever and a cable assembly. The brake lever includes a base member, a guide spring support attached to the base member, and a connector structure attached to the base member. The cable assembly includes a guide spring supported by the guide spring support, and a cable extending through the guide spring. The guide spring support defines an aperture having a perimeter. The guide spring support includes a first tab, a second tab, and a third tab each extending from the perimeter. The guide spring extends through the aperture so as to be positioned in contact with each of the first tab, the second tab, and the third tab. The connector structure has defined therein a slot having a reduced width portion and an increased width portion. The cable further extends though the reduced width portion of the slot.

20 Claims, 4 Drawing Sheets

BLIND CONNECTION BRAKE LEVER FOR A DRUM BRAKING SYSTEM

FIELD OF THE INVENTION

The present disclosure relates to drum braking systems. More specifically, the present disclosure relates to a drum braking system having a brake lever that is configured to connect blindly to a brake cable.

BACKGROUND OF RELATED ART

Drum brakes are a type of braking system that uses friction to slow the rotation of a drum. In a common application, drum brakes are used to reduce the rotational speed of a drum coupled to a vehicle wheel in order to slow the vehicle, to bring the vehicle to a stop, and to ensure the vehicle remains stationary. Generally, drum braking systems include a drum, brake shoes, a backing plate, and a hydraulic cylinder. The drum is a cup-shaped structure that is coupled to an axle. In particular, the drum is often coupled between a wheel and a wheel end of the axle for rotation with the wheel and the axle. The interior of the drum includes a cylindrical surface, referred to as the braking surface. The brake shoes contact the braking surface when the drum braking system is activated. The backing plate is a generally disc-shaped element having a diameter similar to the diameter of the drum. In most configurations, the backing plate is fixed to an axle support structure located near the wheel end of the axle. The backing plate does not rotate with the wheel, drum, and axle; instead, a wheel side of the backing plate supports the hydraulic cylinder, the brake shoes, and the other braking components.

The hydraulic cylinder forcibly pivots the brake shoes against the braking surface of the drum to stop or to limit the rotation of the drum. The hydraulic cylinder includes two pistons that slide in a bore and that define a sealed chamber between them. An end of each piston contacts one of the brake shoes, which are pivotally coupled to the backing plate.

To activate the drum braking system an actuator, usually a foot pedal, is moved, thereby causing an increased hydraulic pressure in the sealed chamber of the hydraulic cylinder. The increased pressure forces the pistons to extend from the bore and to pivot the brake shoes into contact with the braking surface of the drum. Friction between the brake shoes and the braking surface slows the rotation of the drum and the rotation of a corresponding wheel coupled thereto.

In addition to being hydraulically activated, a drum braking system may also include a mechanical actuation system that provides a parking brake or an emergency brake function. The mechanical actuation system is operable to pivot at least one of the brake shoes into contact with the braking surface of the drum, even when the hydraulic cylinder is inactivated, disabled, or nonfunctional. The mechanical actuation system may include a brake lever, a hand or foot operated actuator (referred to as a manual actuator), and a cable. The brake lever is pivotally connected to the wheel side of the backing plate. As the brake lever is pivoted in a braking direction, one or more of the brake shoes are forced into contact with the braking surface of the drum. Likewise, as the brake lever is pivoted in a release direction, the brake shoes pivot away from the braking surface of the drum. The cable couples the brake lever to the manual actuator, which is movable between an engaged and a disengaged position. When the manual actuator is moved to the engaged position, the cable applies a force to the brake lever thereby causing it to pivot in the braking direction, and, in turn, causing the brake shoes to pivot toward and contact the braking surface, thereby reducing the rotational speed of the drum. Similarly, movement of the manual actuator to the disengaged position causes the brake lever to pivot in the release direction, and, in turn, reducing or eliminating the force maintaining the brake shoes against the braking surface of the drum and enabling the drum to rotate freely.

It can be time consuming and cumbersome to connect the cable to the brake lever of some drum braking systems. Specifically, due to the cup shape of the drum and the generally disc shape of the backing plate, the brake lever becomes concealed when the drum is coupled to the axle. Therefore, further developments in the area of brake levers for drum braking systems are desirable.

SUMMARY

According to one embodiment of the present disclosure a brake lever assembly having a brake lever and a cable is provided. The brake lever includes a base member, a guide spring support attached to the base member, and a connector structure attached to the base member. The cable assembly includes a guide spring supported by the guide spring support and a cable extending through the guide spring. The guide spring support defines an aperture having a perimeter. The guide spring support includes a first tab, a second tab, and a third tab each extending from the perimeter. The guide spring extends through the aperture so as to be positioned in contact with each of the first tab, the second tab, and the third tab. The connector structure has defined therein a slot having a reduced width portion and an increased width portion. The cable further extends through the reduced width portion of the slot.

According to another embodiment of the present disclosure a brake lever assembly is provided. The brake lever assembly includes a brake lever and a cable. The brake lever includes a base member, a sheath support attached to the base member, and a container structure attached the base member. The cable assembly includes a sheath supported by the sheath support and a cable extending through the sheath. The sheath support defines an aperture having a perimeter. The sheath support includes a first tab, a second tab, and a third tab. The sheath extends through the aperture so as to be positioned in contact with each of the first tab, the second tab, and the third tab. The connector structure has defined therein a slot having a reduced width portion and an increased width portion. The cable further extends through the reduced width portion of the slot. The sheath includes a first sheath portion possessing a first diameter, and a second sheath portion possessing a second diameter which is less than the first diameter. The first sheath portion is positioned on a first side of the sheath support, and the second sheath portion is positioned on a second opposite side of the sheath support.

BRIEF DESCRIPTION OF THE FIGURES

Features of the present invention will become apparent to those skilled in the art from the following description with reference to the figures, in which.

Corresponding reference numerals and characters indicate corresponding parts throughout the several figure views.

DETAILED DESCRIPTION

Figure 1:
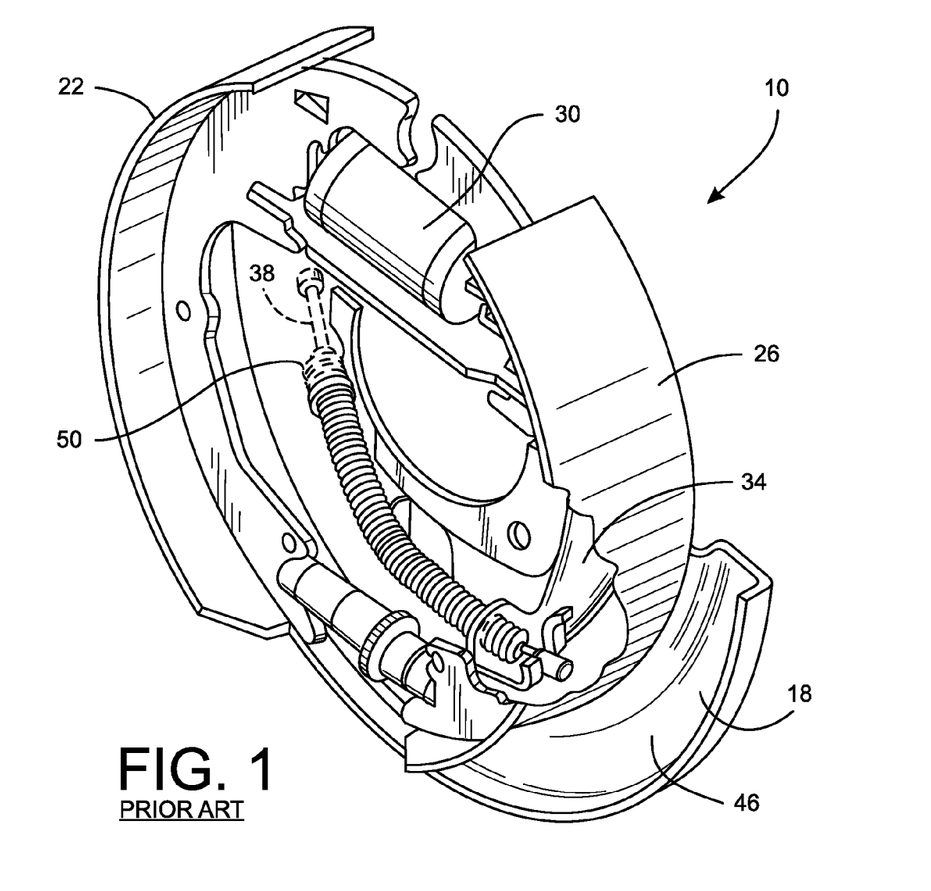
FIG. 1 is a perspective front view of a prior art drum brake having a prior art brake lever.
Figure 2:
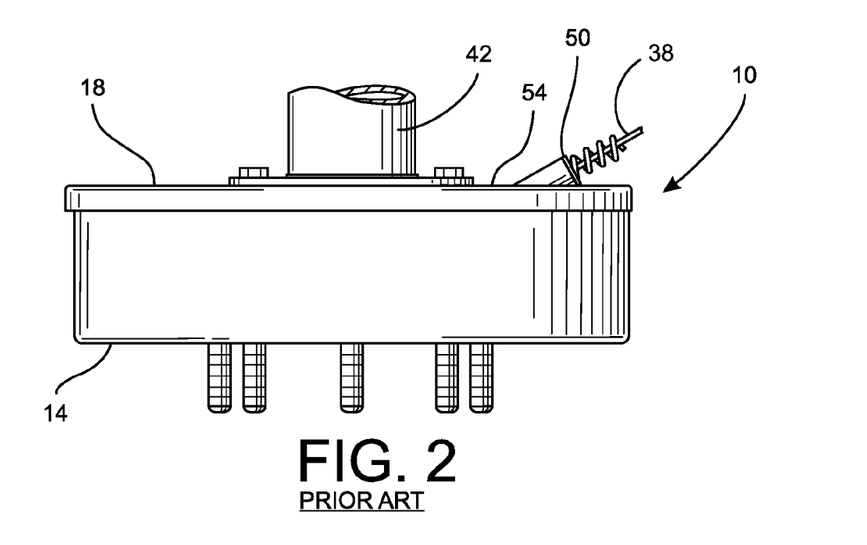
FIG. 2 is a top view of the prior art drum brake of FIG. 1.

A prior art drum brake 10 is shown in FIGS. 1 and 2. The brake 10 is operable to reduce the angular velocity of a rotating body, such as a wheel (not illustrated), coupled to the brake 10. The brake 10 includes a drum 14, a backing plate 18, a pair of brake shoes 22, 26, a hydraulic cylinder 30, a brake lever 34, and a cable 38. The backing plate 18 is typically attached to the axle housing 42 of a vehicle. The braking components are connected to a front side 46 of the backing plate 18. The backing plate 18 is configured to conceal the brake components from debris and other particulate matter that may interfere with the operation of the brake 10. Accordingly, the backing plate 18 is generally imperforate except for a cable aperture 50, as described below. The drum 14 is a cup-shaped element that encapsulates the brake components and conceals the front side of the backing plate 18. Once the drum 14 is coupled to an axle, access to the brake components is available only from the back side 54 of the backing plate 18 through the cable aperture 50.

As shown FIG. 1, the brake shoes 22, 26 are pivotally retained on the backing plate 18 and are operated by either the hydraulic cylinder 30 or the brake lever 34. The top portion of each brake shoe 22, 26 pivots toward a braking surface of the drum 14 to reduce the angular velocity of the drum 14. In particular, friction between the brake shoes 22, 26 and the braking surface reduces the angular velocity of the drum 14. The hydraulic cylinder 30 pivots the brake shoes 22, 26 toward the braking surface in response to the activation of a hydraulic actuator (not illustrated), such as a foot pedal. Additionally, one or more of the brake shoes 22, 26 may be pivoted toward the braking surface by a manual actuator 124, as explained below.

The present disclosure relates to a drum braking system 99. The system 99 is configured and operates in the same manner as the brake 10 except that, as explained in detail below, an alternative brake lever assembly 100 is substituted for the brake lever assembly of the brake 10. The drum braking system 99 includes a brake lever assembly 100. Referring to FIGS. 3-8d, portions of the brake lever assembly 100 are shown in more detail. In an engaged configuration, the brake lever assembly 100 pivots a brake shoe 26 against the braking surface of the drum 14 to stop rotation of the drum 14, to reduce the angular velocity of the drum 14, or to prevent the drum 14 from rotating. Although, the illustrated drum braking system 99 pivots only one brake shoe 26 in response to the brake lever 100 becoming engaged, the drum braking system 99 may include a linkage assembly (not illustrated) configured to pivot the other brake shoe 22 in response to engagement of the brake lever assembly 100.

The brake lever assembly 100 includes a cable assembly 104 and a brake lever 108. The cable assembly 104 may be blindly connected to the brake lever 108. The term "blindly connected" indicates that the cable assembly 104 can be connected to the brake lever 108, even when the brake lever 108 is concealed by the drum 14 and the backing plate 18.

Figure 3:
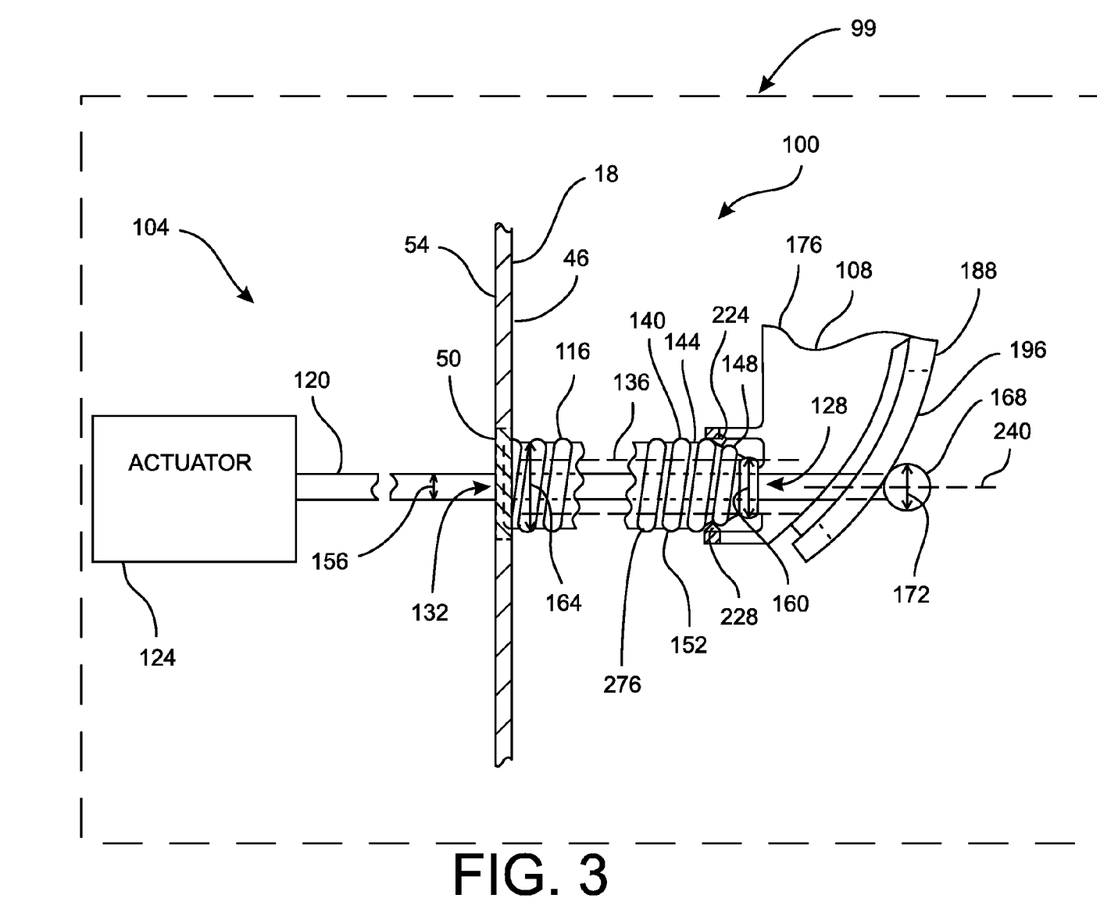
FIG. 3 is a partial cross-sectional view of a drum braking system, according to one embodiment of the present disclosure, showing a broken view of a cable assembly.

As shown in FIG. 3, the cable assembly 104 includes a guide spring or sheath 116, a cable 120, and an actuator 124. The guide spring 116 guides and supports the cable 120 from the cable aperture 50 to the brake lever 108. The guide spring 116 is a generally tubular element having a first opening 128 positioned near the brake lever 108 and a second opening 132 positioned near the cable aperture 50. The inner diameter 160 of the first opening 128 is less than the inner diameter 164 of the second opening 132. An internal channel 136 extends from the first opening 128 to the second opening 132. The diameter of the channel 136 ranges between the diameter 160 of the first opening 128 and the diameter 164 of the second opening 132. The guide spring 116 includes a small diameter portion 148 and a large diameter portion 152. The exterior diameter of the small diameter portion 148 is less than the exterior diameter of the large diameter portion 152. The channel 136 extends through the small diameter portion 148 and the large diameter portion 152. Although the guide spring 116 has been described as having a diameter, the guide spring 116 is not limited to cylindrical embodiments. For instance, the guide spring 116 may be elliptical, rectangular, or irregularly shaped.

The exterior of the guide spring 116 includes a plurality of winds 140 or ridges separated by valleys 144. The guide spring 116 may be formed by coiling a strip of steel or other suitable material. The guide spring 116 may also be formed from materials, including, but not limited to, plastic, metal, composite materials, silicone, and woven materials. In each embodiment, the guide spring 116 is capable of withstanding the high temperature of the braking system 99 without deforming or otherwise being damaged. In particular, the guide spring 116 may be formed from injection molded thermoplastic. Embodiments of the guide spring 116 formed from moldable materials include a ridged outer surface having the aforementioned winds 140 and valleys 144.

The cable 120 is slidably positioned within the channel 136 of the guide spring 116. The diameter 156 of the cable 120 is less than the diameter of the channel 136. Additionally, the diameter 156 of the cable 120 is less than the diameter 160 of the first opening 128 and the diameter 164 of the second opening 132. The cable 120, therefore, is configured to slide longitudinally within the guide spring 116.

The cable 120 may be formed from numerous materials including single strands of metal or polymer and multi-stranded materials including, but not limited to, wire rope. The cable 120 is resilient and is approximately linear in a relaxed state, which may be referred to as an un-flexed state. Specifically, if the cable 120 is bent or flexed with a force below a deformation threshold, the cable 120 returns to an approximately linear configuration when the force subsides.

A fitting 168 is connected to an end of the cable 120, as shown in FIG. 3. The fitting 168 has a diameter 172, which is larger than the diameter 156 of the cable 120 and smaller than a diameter of the channel 136. The fitting 168, therefore, may slide within the channel 136. In particular, the fitting 168 may enter the first opening 132 of the guide spring 116, slide through the channel 136, and exit the second opening 128 of the guide spring 116. Although the illustrated fitting 168 is approximately spherical, the fitting 168 may be any shape configured to slide through the channel 136 without becoming bound against the internal surface of the guide spring 116. In one particular embodiment, the fitting 168 may be a bullet nosed crimp fitting, as is known in the art.

Figure 4:
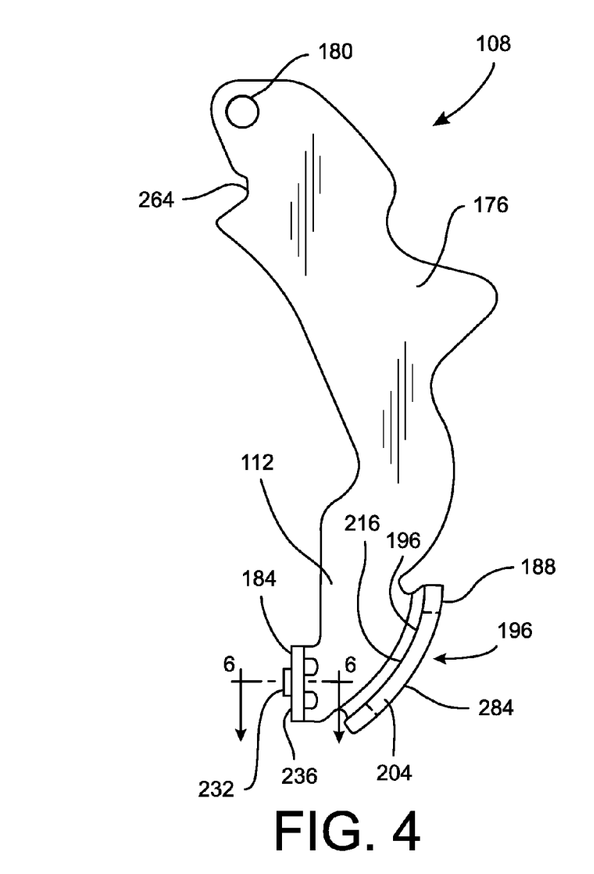
FIG. 4 is a front view of a brake lever for use with the drum braking system of FIG. 3.

Referring now to FIG. 4, the brake lever 108 includes a base member 176, a pivot aperture 180, a guide spring support 184, and a connector structure 188. The base member 176 is a generally planar section of rigid material. The base member 176 may be formed from metal stock and the like. The pivot aperture 180 is an opening in the top (FIG. 4) of the base member 176. A fastener (not illustrated) may extend through the pivot aperture 180 to couple pivotally the base member 176 to the backing plate 18. The guide spring support 184 and the connector structure 188 are connected to the base member 176. In particular, the guide spring support 184 and connector structure 188 are integrally formed with the base member 176, as described below.

The connector structure 188 is formed on the base member 176 and is configured to connect the cable 120 to the brake lever 108. As shown in the partially formed blank 192 of FIG. 5, the connector structure 188 includes a slot 196 having a wide region 200 and narrow region 204. The slot 196 is bordered on all sides by the connector structure 188. The wide region 200 is connected to the narrow region 204. The wide region 200 has a width 208, which is larger than the diameter 172 of the fitting 168 to enable the fitting 168 to extend through the wide region 200. The narrow region 204 has a width 212, which is smaller than the diameter 172 of the fitting 168 and larger than the diameter 156 of the cable 120. Accordingly, the fitting 168 cannot pass through the narrow region 204. The cable 120, however, slides longitudinally (FIG. 3) through the narrow region 204 and the wide region 200. The cable 120 also slides vertically (FIG. 4) in the narrow region 204 and the wide region 200. The connector structure 188 defines a curved surface 216 (FIG. 4) that guides the fitting 168 into engagement with the slot 196.

The guide spring support 184, also referred to herein as a sheath support, fixedly positions the guide spring 116 relative to the connector structure 188 and the base member 176. The guide spring support 184 is formed on the same end portion of the base member 176 as the connector structure 188, but opposed to the connector structure 188. As shown in the brake lever blank 192 of FIG. 5, the guide spring support 184 includes an aperture 220 having three tabs. In particular, the aperture includes a pair of tabs 224, 228 and a tongue 232 spaced around a perimeter 236 of the support 184. The tabs 224, 228 and tongue 232 connect the guide spring 116 to the brake lever 108 without a separate bushing or other connection element. An axis 240 extends through the center of the aperture 220 and the narrow region 204 of the slot 196. When the guide spring 116 is connected to the brake lever 108, the guide spring support 184 separates the small diameter portion 148 from the large diameter portion 152.

Figure 5:
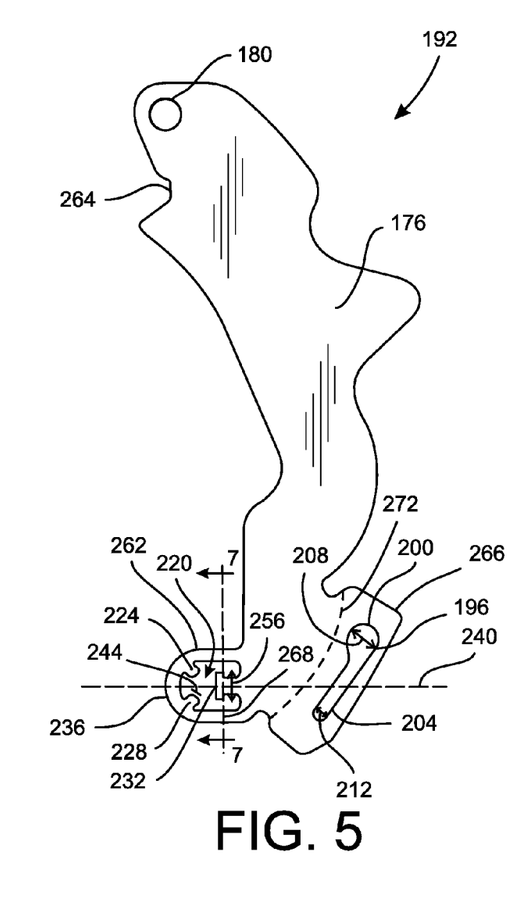
FIG. 5 is a front view of a blank for forming the brake lever of FIG. 4.
Figure 6:
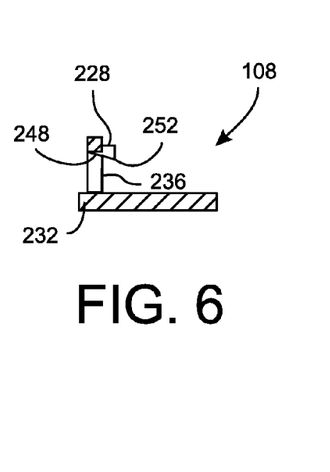
FIG. 6 is a cross-sectional view along line 6-6 of FIG. 4, showing a first portion of a guide spring support of the brake lever of FIG. 4.

The tabs 224, 228 engage the guide spring 116 to connect the guide spring 116 to the brake lever 108. As shown in FIG. 5, the tabs 224, 228 extend toward the center of the aperture 220 and toward the connector structure 188. The tabs 224, 228 define a width 244, which is smaller than the diameter 160 of the first opening 128 of the guide spring 116. Each tab 224, 228 includes an inclined surface 248 that terminates with a barb 252, as shown in FIG. 6. The inclined surface 248 directs the guide spring 116 into engagement with the guide spring support 184. The barbs 252 are configured to be positioned in a valley 144 between adjacent winds 140 when the guide spring 116 is connected to the guide spring support 184. The barbs 252 prevent the guide spring 116 from being disconnected from the guide spring support 184. In particular, forcing the guide spring 116 to the left (FIG. 3) causes the barbs 252 to abut the winds 140, thereby preventing removal of the guide spring 116 from the brake lever 108.

Figure 7:
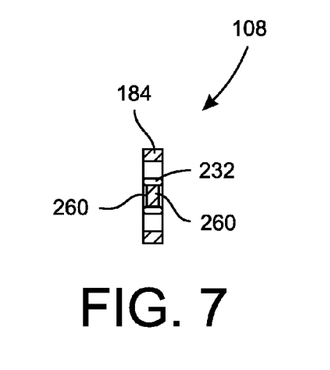
FIG. 7 is a cross-sectional view along line 7-7 of FIG. 5, showing a second portion of the guide spring support of the brake lever of FIG. 4.

The tongue 232, in conjunction with the tabs 224, 228, positions the guide spring 116 relative the slot 196. As shown in FIG. 5, the tongue 232 extends away from the connector structure 188. A distal end of the tongue 232 has a width 256 greater than opening 128 and greater than the width 244 of the tabs 224, 228. Accordingly, during the assembly process the guide spring 116 cannot become mounted upon the tongue 232 instead of being inserted into the aperture 220 of the guide spring support 184. With reference to FIG. 7, the tongue 232 also includes a concave surface 260 shaped complementarily to the exterior surface of the guide spring 116. The concave surface 260 has a radius, which matches approximately the exterior of the guide spring 116.

As shown in FIGS. 4 and 5, some embodiments of the brake lever 108 include a retaining notch 264 configured to receive a retaining element (not illustrated) configured to couple the brake lever 108 to the backing plate. The notch 264 may have any shape required to engage a corresponding retaining element.

The brake lever 108 may be formed according to the process described below. First the brake lever blank 192, illustrated in FIG. 5, is cut from a section of stock or the like. In particular, the blank 192 may be cut with a blanking die, laser cut, or formed with a computer numerical controlled ("CNC") machine tool, among other methods and devices. Projection 262 is pierced or cut to form aperture 220, and projection 266 is pierced or cut to form slot 196. The projections 262, 266 may be pierced or cut with a bit, die, laser, CNC machine tool, or the like.

After the blank 192 is pierced or cut, the projections 262, 266 are bent to form the guide spring support 184 and the connector structure 188. With reference to FIG. 5, the perimeter 236 of the guide spring support 184 is bent along line 268 approximately ninety degrees relative to the base member 176. After being bent the perimeter 236 defines a plane that is perpendicular to a plane defined by the base member 176. Similarly, the connector structure 188 is bent along arcuate line 272 approximately ninety degrees relative to the base member 176. The curved surface 216 is perpendicular to the plane defined by the base member 176.

Figure 8A:
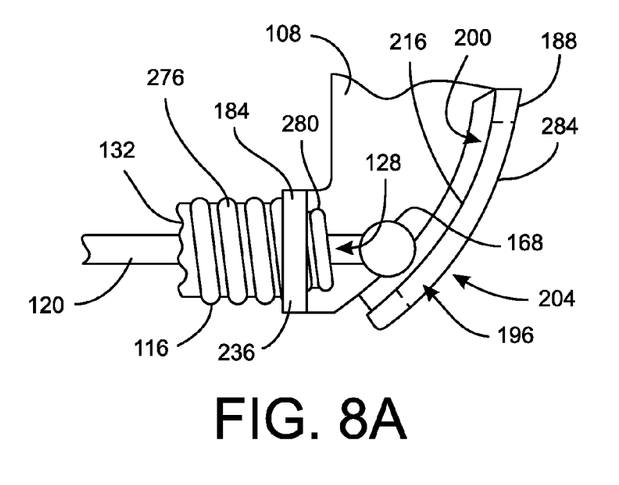
FIGS. 8a-8d depict views of a cable becoming coupled to the brake lever of FIG. 4.

Next, the brake lever 108 is connected to the drum braking system 99. Specifically, the brake lever 108 is connected to the backing plate 18 in a similar position and orientation as the brake lever 34 shown in FIG. 1. To prepare the brake lever assembly 100 for being connected to the backing plate 18, first the small diameter portion 148 of the guide spring 116 is inserted through the aperture 220 of the guide spring support 184. As the large diameter portion 152 of the guide spring 116 approaches the guide spring support 184, the exterior of the guide spring 116 contacts the tongue 232 and the tabs 224, 228. The concave surface 260 of the tongue 232 aligns the opening 128 with axis 240. Additionally, the barbs 252 become seated in a valley 144 to secure the guide spring 116 to the brake lever 108. When connected to the guide spring support 184, the guide spring 116 contacts the concave surface 260 of the tongue 232 and the tabs 224, 228, and the small diameter portion 148 is positioned between the spring guide support 184 and the connector structure 188. The tabs 224, 228 and the tongue 232 align opening 128 with axis 240 regardless of the position or orientation of the left portion 276 (FIG. 3) of the guide spring 116, as shown in FIG. 8a. Specifically, the left portion 276 (FIG. 3) of the guide spring 116 may be routed, bent, and/or positioned without causing the opening 128 to deviate from axis 240.

The brake lever 108 and guide spring support 184 are then connected to the backing plate 18. Specifically, a fastener may be inserted through the pivot aperture 180 to connect pivotally the brake lever 108 to the backing plate 18. A linkage (not illustrated) or other retaining element may contact the retaining notch 264. Next, opening 132 is secured to the cable aperture 50. Specifically, the guide spring 116 is compressed to generate a spring force, and opening 132 is placed in contact with the backing plate 18 and in alignment with the cable aperture 50. The spring force maintains the opening 132 against the backing plate 18 and in alignment with the cable aperture 50. Alternatively, a clip or other fastener (not illustrated) may couple the guide spring 116 to the backing plate 18 in alignment with the cable aperture 50. The channel 136 is accessible from the rear side 54 of the backing plate 18 through the cable aperture 50.

The cable 120 is connected to the connector structure 188 of the brake lever 108 according to the process described below and illustrated in FIGS. 8a-8d. This process is known as a "blind connection" because the portion of the brake lever 108 to which the cable 120 connects is not visible to a user assembling the brake 10. Specifically, the drum 14 is coupled to the axle before the cable 120 is connected to the brake lever 108. Accordingly, the brake lever 108 and the other braking components are concealed by the backing plate 18 and the generally imperforate cup-shaped drum 14. Only the opening 132 of the guide spring 116 is visible to a user attempting to connect the cable 120 to the brake lever 108. Neither the guide spring support 184 nor the slot 196 of the connector structure 188 are visible through the cable aperture 50.

To connect the cable 120 to the brake lever 108, the fitting 168 is inserted into the guide spring 116 through the cable aperture 50 in the backing plate 18. As the cable 120 is advanced, the fitting 168 moves toward the brake lever 108, guided by the channel 136, and exits the guide spring 116 through opening 128. The fitting 168 follows the channel 136 of the guide spring 116, which may be linear, curved, bent, or otherwise irregular, without become bound against the internal surface of the guide spring 116. After exiting the guide spring 116, the fitting 168 crosses the gap between the spring guide support 184 and the connector structure 188 and contacts the curved surface 216, as shown in FIG. 8a. When the fitting 168 exits the opening 128 it contacts the narrow region 204 of the slot 196, because the opening 128 is aligned with axis 240.

Figure 8B:
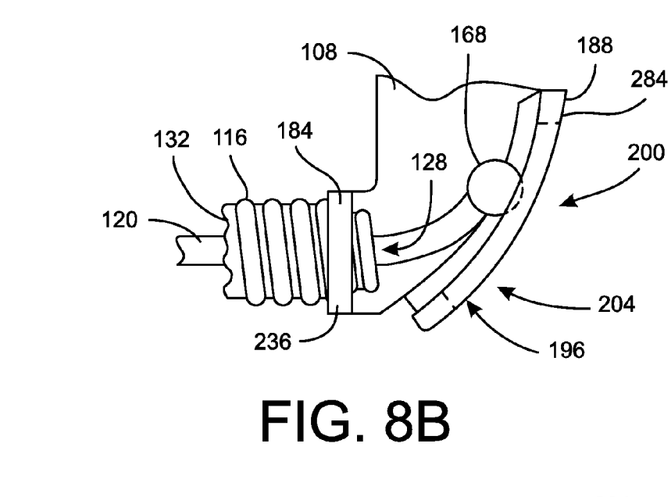

When the fitting 168 contacts the narrow region 204 of the slot 196, the fitting 168 does not pass through the slot 196. Instead, as shown in FIG. 8b, due to the spherical shape of the fitting 168 a portion of the fitting 168 becomes seated in the slot 196. As the cable is further advanced, the fitting 168 is guided by the narrow region 204 to the wide region 200. Specifically, the force exerted upon the cable 120 as it is inserted into the cable aperture 50 causes the fitting end of the cable 120 to bend toward the wide region 200 of the slot 196 along curved surface 216. The resiliency of the cable 120 maintains the fitting 168 against the connector structure 188.

Figure 8C:
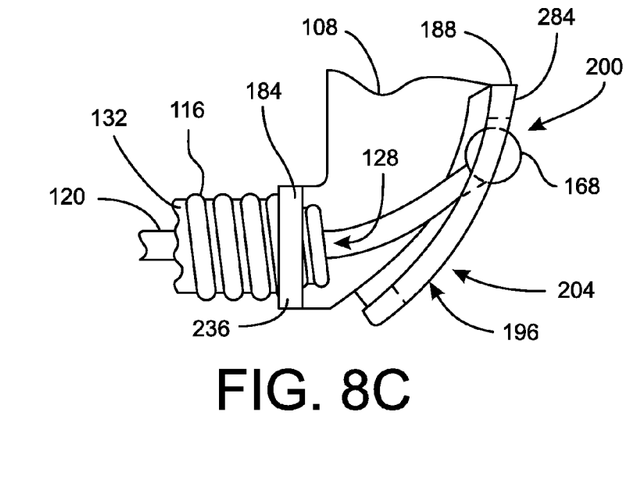
Figure 8D:
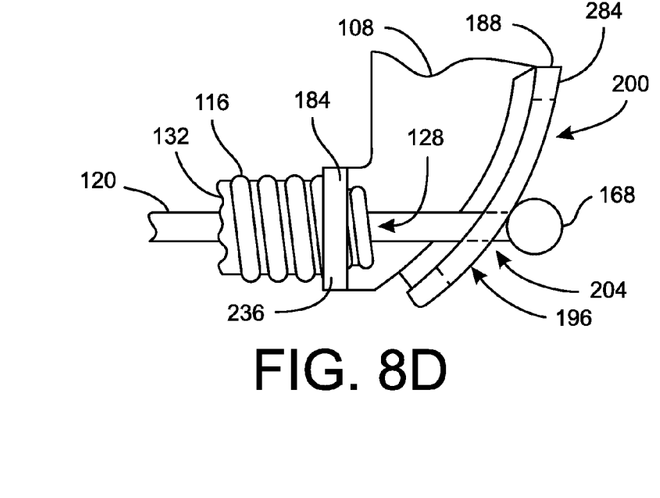

As the cable 120 is further advanced into the cable aperture 50 the fitting 168 reaches the wide region 200. Once the fitting 168 reaches completely the wide region 200, the resiliency of the cable 120 forces the fitting 168 through the wide region 200, as shown in FIGS. 8c and 8d. Specifically, the resiliency of the cable 120 forces the fitting 168 through the slot 196, because the diameter 172 of the fitting 168 is less than the width 208 of the wide region 200. Additionally, because the diameter 156 of the cable 120 is less than the width 208 of the wide region 200 and the narrow region 204 there remains no barrier preventing the cable 120 from returning to an approximately linear configuration, sometimes referred to an unflexed state, as shown in FIG. 8d. The sufficiently resilient cable 120 "snaps", or otherwise moves, to the linear configuration of FIG. 8d as the fitting 168 passes through the wide region 200. A user coupling the cable 120 to the brake lever 108 feels the snap or movement of the cable 120 to determine that the cable 120 has passed through the wide region 200 of the slot 196. Alternatively, depending on the ambient noise level, a user may hear the cable 120 snap, or otherwise move, through the wide region 200.

Next, the cable 120 is retracted slightly from the cable aperture 50 causing the fitting 168 to abut an outer side 284 of the connector structure 188. Retracting the cable 120 does not cause the fitting 168 to pass through the slot 196, because the diameter 172 of the fitting 168 is greater than the width 212 of the narrow region 204 of the slot 196.

The cable 120 remains coupled to the brake lever 108 regardless of the axial position of the cable 120. In particular, movement of the cable 120 to the left (FIG. 8d) causes the brake lever 108 to pivot in the braking direction. Whereas, movement of the cable 120 to the right (FIG. 8d) causes the fitting 168 to move away from the connector structure 188; however, the cable 120 remains within the slot 196, and upon moving the cable 120 to the left (FIG. 8d) the fitting 168 again contacts the connector structure 188. The fitting cannot become decoupled from the brake lever 108 during normal usage and operation of the brake lever assembly 100, because the connector structure 188 surrounds completely the slot 200. The cable 120 may be removed from the brake lever 108 by removing the drum 14 and bending the fitting 168 toward the wide region 200 of the slot 196 then withdrawing the cable 120 from the cable aperture 50.

In operation, the end of the cable 120 opposite the fitting 168 may be connected to an actuator 124 movable between a release position and an engaged position. As the actuator 124 is moved toward the engaged position, the cable 120 pivots the brake lever 108 to the left (FIG. 4). Pivoting of the brake lever 108 forces the brake shoe 26 to contact the braking surface of the drum 14. As the actuator 124 is moved toward the release position a braking element, such as a spring, pivots the brake lever 108 to the right (FIG. 4). The guide spring 116 and the cable 120 remain coupled to the brake lever 108 as the brake lever 108 is pivoted.

Variations and modifications of the present invention as described above are possible; however, all variations and modifications which are obvious to those skilled in the art to which the present invention pertains are considered to be within the scope of the protection granted by this Letters Patent.

What is claimed is:

1. A brake lever assembly, comprising:
   a brake lever including (i) a base member, (ii) a guide spring support attached to said base member, and (iii) a connector structure attached to said base member; and
   a cable assembly including (i) a guide spring supported by said guide spring support, and (ii) a cable extending through said guide spring,
   wherein said guide spring support defines an aperture having a perimeter,
   wherein said guide spring support includes a first tab, a second tab, and a third tab each extending from said perimeter,
   wherein said guide spring extends through said aperture so as to be positioned in contact with each of said first tab, said second tab, and said third tab,
   wherein said connector structure has defined therein a slot having a reduced width portion and an increased width portion,
   wherein at least one of said first tab, second tab, and third tab extends toward an axis which extends through said aperture and said reduced width portion, and
   wherein said cable further extends though said reduced width portion of said slot.

2. The brake lever assembly of claim 1, wherein said brake lever is prepared by the process of:
forming a lever blank having a first projection and a second projection from a sheet of metal stock,
piercing the lever blank so as to (i) form the aperture in the first projection and create the first tab, the second tab, and the third tab, and (ii) form the slot in the second projection and create the reduced width portion and the increased width portion,
bending the first projection relative to the base member so as to form the guide spring support, and
bending the second projection relative to the base member so as to form the connector structure.

3. The brake lever assembly of claim 1, wherein:
said brake lever includes a first end portion and a second end portion,
said first end portion includes said guide spring support and said connector structure, and
said second end portion defines a pivot aperture.

4. The brake lever assembly of claim 1, wherein said first tab, said second tab, and said third tab are spaced apart from each other.

5. The brake lever assembly of claim 1, wherein:
said first tab has a first distal end portion defining a first width,
said second tab has a second distal end portion defining a second width,
said third tab has a third distal end portion defining a third width,
said third width is greater than each of said first width and said second width,
a distal segment of said guide spring has an inner diameter,
said inner diameter is greater than each of said first width and said second width, and
said inner diameter is less than said third width.

6. The brake lever assembly of claim 1, wherein:
said first tab is configured to extend toward said connector structure, and
said second tab is configured to extend toward said connector structure.

7. The brake lever assembly of claim 6, wherein said third tab is configured to extend away from said connector structure.

8. The brake lever assembly of claim 7, wherein said third tab possesses a concave contact surface configured complementary to an exterior surface of said guide spring.

9. The brake lever assembly of claim 6, wherein said first tab has a first barb projecting between a pair of adjacent winds of said guide spring.

10. The brake lever assembly of claim 9, wherein said second tab has a second barb projecting between said pair of adjacent winds of said guide spring.

11. The brake lever assembly of claim 1, wherein:
said guide spring includes (i) a first guide portion possessing a first diameter, and (ii) a second guide portion possessing a second diameter which is less than said first diameter,
said first guide portion is positioned on a first side of said guide spring support, and
said second guide portion is positioned on a second opposite side of said guide spring support.

12. The brake lever assembly of claim 11, wherein said second guide spring portion is interposed between said guide spring support and said connector structure.

13. The brake lever assembly of claim 1, wherein:
said cable includes an enlarged distal end portion, and
said enlarged distal end portion is positioned in contact with said connector structure.

14. The brake lever assembly of claim 1, wherein said brake lever assembly is prepared by the process of:
(a) advancing the cable in relation to the guide spring in a first direction so that an enlarged distal end portion of the cable contacts the connector structure adjacent to said reduced width portion of said slot,
(b) further advancing the cable in relation to the guide spring in the first direction after step (a) so that said cable assumes a flexed configuration and said enlarged distal end portion of the cable contacts the connector structure adjacent to said increased width portion of said slot,
(c) further advancing the cable in relation to the guide spring in the first direction after step (b) so that said enlarged distal end portion of the cable passes through said increased width portion of said slot and thereafter assumes an unflexed configuration, and
(d) further advancing the cable in relation to the guide spring in a second opposite direction after step (c) so that said enlarged distal end portion of the cable contacts said connector structure.

15. A brake lever assembly, comprising:
a brake lever including (i) a base member, (ii) a sheath support attached to said base member, and (iii) a connector structure attached to said base member; and
a cable assembly including (i) a sheath supported by said sheath support, and (ii) a cable extending through said sheath,
wherein said sheath support defines an aperture having a perimeter,
wherein said sheath support includes a first tab, a second tab, and a third tab,
wherein said sheath extends through said aperture so as to be positioned in contact with each of said first tab, said second tab, and said third tab,
wherein said connector structure has defined therein a slot having a reduced width portion and an increased width portion,
wherein said cable further extends through said reduced width portion of said slot,
wherein said sheath includes (i) a first sheath portion possessing a first diameter, and (ii) a second sheath portion possessing a second diameter which is less than said first diameter,
wherein said first sheath portion is positioned on a first side of said sheath support,
wherein said second sheath portion is positioned on a second opposite side of said sheath support, and
wherein said second opposite side is between said first side and said connector structure.

16. The brake lever assembly of claim 15, wherein said brake lever is prepared by the process of:
forming a lever blank having a first projection and a second projection from a sheet of metal stock,
piercing the lever blank so as to (i) form the aperture in the first projection and create the first tab, the second tab, and the third tab, and (ii) form the slot in the second projection and create the reduced width portion and the increased width portion,
bending the first projection relative to the base member so as to form the sheath support, and
bending the second projection relative to the base member so as to form the connector structure.

17. The brake lever assembly of claim 15, wherein:
said first tab is configured to extend toward said connector structure,
said second tab is configured to extend toward said connector structure, and
said third tab is configured to extend away from said connector structure.

18. The brake lever assembly of claim 17, wherein:
said first tab has a first distal end portion defining a first width,
said second tab has a second distal end portion defining a second width,
said third tab has a third distal end portion defining a third width,
said third width is greater than each of said first width and said second width,
said second sheath portion has an inner diameter,
said inner diameter is greater than each of said first width and said second width, and
said inner diameter is less than said third width.

19. The brake lever assembly of claim 17, wherein:
said third tab possesses a concave contact surface configured complementary to an exterior surface of said sheath,
said first tab has a first barb projecting between a pair of adjacent winds of said sheath,
said second tab has a second barb projecting between said pair of adjacent winds of said sheath.

20. The brake lever assembly of claim 15, wherein:
said cable includes an enlarged distal end portion, and
said enlarged distal end portion is positioned in contact with said connector structure.

\* \* \* \* \*